No. 798,540. PATENTED AUG. 29, 1905.
R. C. STEVENSON & C. RYLAND.
MAGAZINE AND REPEATING RIFLE.
APPLICATION FILED SEPT. 28, 1904.
5 SHEETS—SHEET 1.
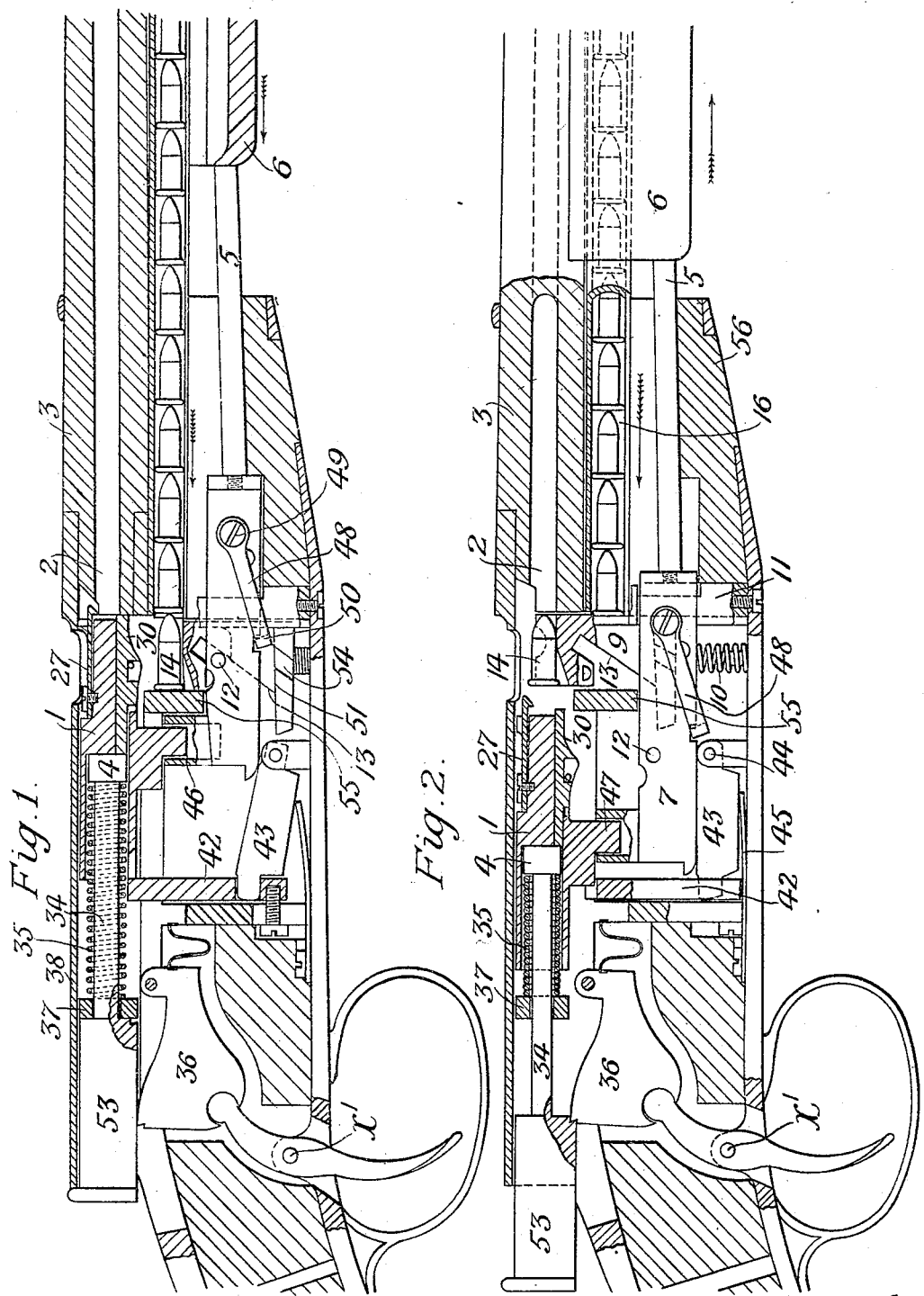

No. 798,540. PATENTED AUG. 29, 1905.
R. C. STEVENSON & C. RYLAND.
MAGAZINE AND REPEATING RIFLE.
APPLICATION FILED SEPT. 28, 1904.

5 SHEETS—SHEET 2.

Witnesses.

Inventors
Robert Campbell Stevenson
Charles Ryland
by B. Singer atty

No. 798,540. PATENTED AUG. 29, 1905.
R. C. STEVENSON & C. RYLAND.
MAGAZINE AND REPEATING RIFLE.
APPLICATION FILED SEPT. 28, 1904.
5 SHEETS—SHEET 3.
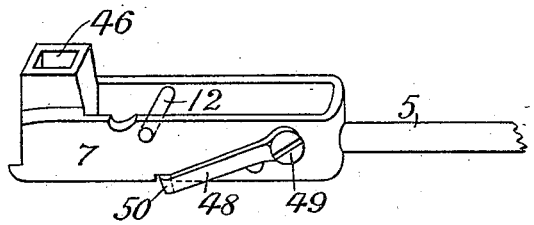
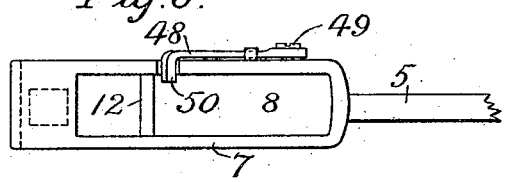
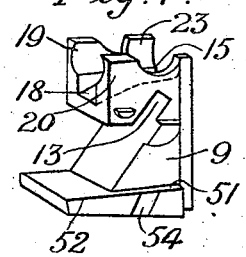
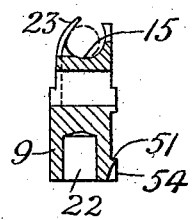
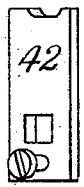
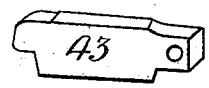

No. 798,540. PATENTED AUG. 29, 1905.
R. C. STEVENSON & C. RYLAND.
MAGAZINE AND REPEATING RIFLE.
APPLICATION FILED SEPT. 28, 1904.
5 SHEETS—SHEET 4.
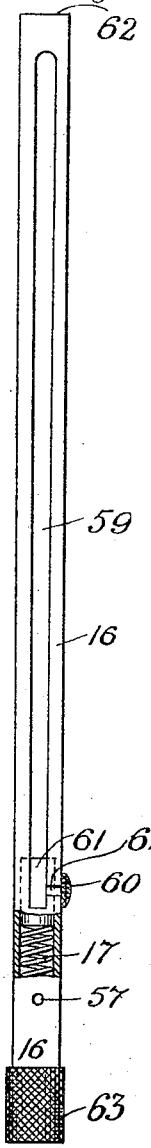
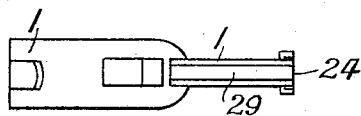
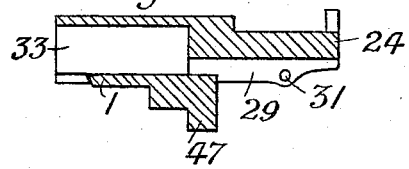
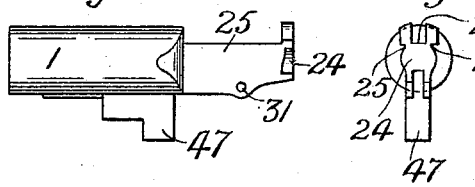 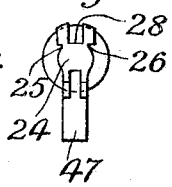
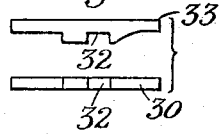
Witnesses.
Inventors
Robert Campbell Stevenson
Charles Ryland
by P. Singer atty No. 798,540. PATENTED AUG. 29, 1905.
R. C. STEVENSON & C. RYLAND.
MAGAZINE AND REPEATING RIFLE.
APPLICATION FILED SEPT. 28, 1904.
5 SHEETS—SHEET 5.
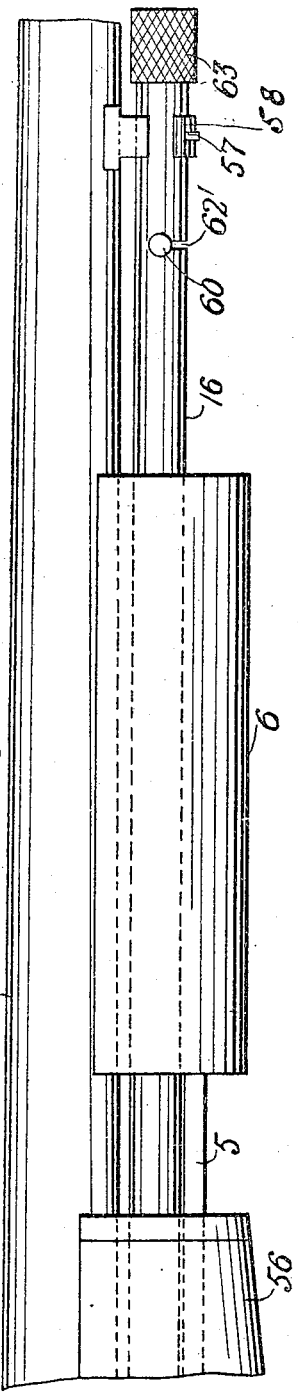
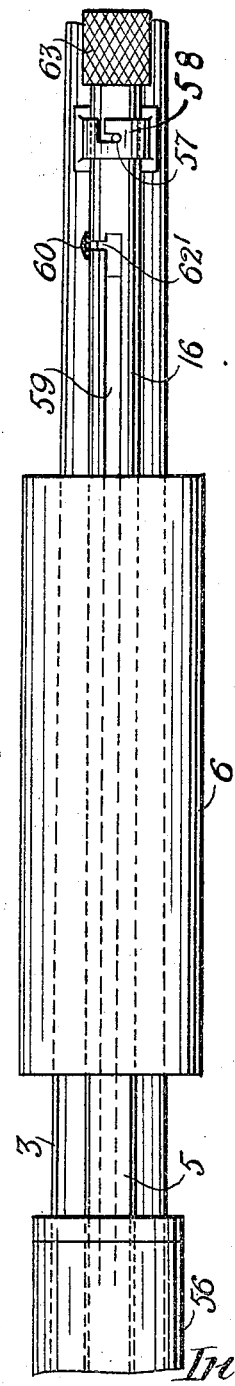
Witnesses:
Inventors
Charles Ryland
Robert Campbell Stevenson
by B. Singer
Attorney

UNITED STATES PATENT OFFICE.

ROBERT CAMPBELL STEVENSON, OF KILMARNOCK, SCOTLAND, AND CHARLES RYLAND, OF BIRMINGHAM, ENGLAND.

MAGAZINE AND REPEATING RIFLE.

No. 798,540.      Specification of Letters Patent.      Patented Aug. 29, 1905.

Application filed September 28, 1904. Serial No. 226,363.

*To all whom it may concern:*

Be it known that we, ROBERT CAMPBELL STEVENSON, residing at Rosehill, London Road, Kilmarnock, Ayrshire, Scotland, and CHARLES RYLAND, residing at 18 Weaman street, in the city of Birmingham, England, have jointly invented new and useful Improvements in Magazine and Repeating Rifles; and we hereby declare that the following is a full, clear, and exact description of the same.

This invention has reference to magazine-rifles or repeating-rifles of the kind described in the specification of Letters Patent No. 749,463, dated January 12, 1904, granted to R. C. Stevenson, in which a tubular sliding bolt for placing the cartridge in the chamber and containing the striker for firing it is operated by a sliding cocking-rod which has a handle underneath the barrel.

The invention comprises improvements in the magazine and in the mechanism for feeding the cartridges in successive order to the space in the front of the chamber to be pushed forward thereinto by the bolt. The mechanism is of simple construction and is certain in action, and the magazine is so arranged that it will hold a large number—say twelve—of the .2 cartridges and feed them properly up into position, as aforesaid, for firing.

The said invention also comprises an improved form of magazine for the said rifle.

Figure 3:
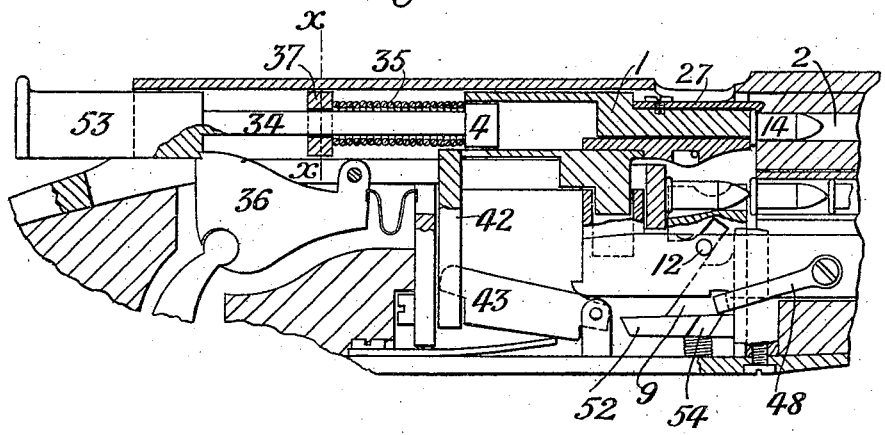
Figure 4:
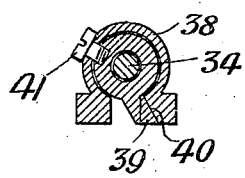

In the accompanying drawings, which illustrate the invention, Figure 1 is a sectional side elevation of the main portion of a magazine-rifle or repeating-rifle constructed in accordance with this invention, showing the parts in the positions which they occupy after the rifle has been fired. Fig. 2 is a sectional side elevation of the same magazine-rifle or repeating-rifle, showing the parts in the positions which they occupy when a cartridge has by the mechanism been brought up into position to be carried forward into the chamber; and Fig. 3 shows some of the same parts with the cartridge pushed forward into the chamber and the rifle cocked ready for firing. Fig. 4 is a cross-section through the bolt and its casing on line X X of Fig. 3. Fig. 5 is a general view of the back part of the cocking-piece. Fig. 6 is an inverted plan of the same. Fig. 7 is a general view of the cartridge-carrier block, and Fig. 8 is a cross-sectional elevation of the same. Fig. 9 shows separately the bolt-check of the rifle. Fig. 10 is a separate view of the bolt-check lever of the same. Fig. 11 is an inverted plan of the bolt separately. Fig. 12 is a sectional side elevation of the bolt. Fig. 13 is a side elevation of the same. Fig. 14 is a front elevation of the same. Fig. 15 is a side elevation and inverted plan of the hammer. Fig. 16 is a plan and side elevation of the extractor, and Fig. 17 is a plan of the magazine. Figs. 18 and 19 illustrate in side elevation and inverted plan, respectively, the fore part of the improved rifle having a bayonet-slot connection between the magazine and a clip-bracket on the barrel of the rifle.

The same reference-numerals indicate the same parts in all the figures.

1 is the tubular sliding bolt which places the cartridges in successive order in the chamber 2 at the back end of the barrel 3.

4 is the hammer, partly contained in the sliding bolt.

5 is the sliding cocking-rod, which operates the sliding bolt, and 6 is the sliding handle of the cocking-rod underneath the barrel.

In carrying out this invention the back end part 7 of the cocking-rod is enlarged and made with a vertical slot 8, in which is located the cartridge-carrier block 9 (shown separately by Figs. 7 and 8) and which is adapted for vertical movement. This cartridge-block 9 is pressed upwardly by a suitable spring 10 underneath it and is arranged to work up and down a slot in the guide-piece 11, which is fixed to the frame and which projects upwardly through the slot 8. Passing through the back end piece 7 of the cocking-rod there is a cross-pin 12, which at proper times engages in an inclined slot 13 in the carrier-block 9. This slot 13 is so shaped, as shown, that when the cocking-rod 5 is pushed forward by the handle 6 to move the bolt 1 forward and push the cartridge 14 into the chamber 2 the cross-pin 12, acting on the inclined side of the slot 13, forces the carrier-block 9 down against its spring 10, as in Fig. 1, so that the top part 15 of the carrier-block is opposite the outlet from the magazine 16, (which latter is situated between the cocking-rod 5 and the barrel 3,) and then the cartridge 14, which is situated in the rear end of the magazine, is, by the spring 17 in the magazine, forced backwardly into the slot in the top of the carrier-block ready to be raised by the carrier-block into the position shown by Fig. 2 in front of the bolt 1 and behind the chamber 2, when the cocking-rod 5 is pushed back to cock the rifle.

The upper part of the carrier-block which receives the cartridge is inclined at 18 below the cartridge for the purpose hereinafter described and has two upwardly-projecting sides 19 20 above the inclined part 18, the adjacent surfaces of which are hollowed, as in Figs. 7 and 8, to receive the cartridge, the distance between these sides being just sufficient to allow of the rim of the cartridge to pass through endwise. Fixed to the side of the front part of the carrier-block 9 there is an upwardly-projecting leaf-spring 23, which presses against the side of the fore part of the cartridge, so as to prevent it from jumping out of the carrier-block when, by the operation of the cocking-rod 5 and the spring 10, it is pushed up into position at the back of the chamber 2, as in Fig. 2. The front end 24 of the bolt 1 is made with side notches 25 26 to pass between the inwardly-projecting top parts of the sides 19 20 of the carrier-block 9, so that the fore part of the bolt can pass in between these sides when pushing the cartridge into the chamber 2. On the upper surface 25 of the fore part of the bolt 1 there is fixed the extractor 27, which is shown separately by Fig. 16 and which fits in a slot 28 in the front part 24 of the bolt. In a longitudinal slot 29 in the lower part of the bolt there is a striker 30, which is adapted to slide endwise in the bolt for a short distance, the movement of the hammer being limited by the cross-pin 31, which takes into a slot 32 in the striker 30. The fore part 4 of the hammer fits in a circular longitudinal recess 33 in the bolt 1, and when firing the cartridge the fore part 4 of the hammer strikes the back end of the striker 30, so that the blow is delivered by the front end of the striker 30 onto the rim of the cartridge, thus exploding the same. The extractor 27 and the striker 30 are of well-known construction.

Around the shank 34 of the hammer 4 there is a coiled spring 35, which propels the hammer forward after it has been released by the sear 36.

37 is the rear abutment for the spring 35, and this is fixed in the bolt-casing 38, so as to facilitate the placing of the bolt-hammer 4, with its spring, in the casing 38. This rear abutment 37 is shown in cross-section by Fig. 4 and consists of a collar having a central hole through which the stem 34 of the hammer 4 can slide, and this collar is made to fit in the tubular casing 38 and, with the hammer 4, is moved along the same to the position shown in Figs. 1, 2, and 3, and then the rear abutment is turned axially through a small angle until a lateral projecting part 39, which is formed on it, takes into a corresponding side slot 40 in the casing 38, as in Fig. 4, which prevents any lateral movement of the abutment, and the latter is kept in this position by the small screw 41, which is screwed into it through a hole in the casing 38, as shown in Fig. 4.

42 is the bolt-check, which moves vertically through a small distance and engages with the outer end of the bolt-check lever 43, which turns on a pivot at 44 and is moved upwardly by the leaf-spring 45, so as to move the bolt-check 42 to the position shown in Fig. 1 at the back of the bolt when the latter has moved forward to close the cartridge in the chamber 2. This bolt-check lever 43 and bolt-check 42 are depressed at the proper times by the back part 7 of the cocking-rod 5 sliding over the lever 43, as in Fig. 2, and they are raised at the proper times by the spring 45, when the cocking-rod is moved forward, as in Figs. 1 and 3. The back part 7 of the cocking-rod is connected to the bolt 1 by having a top socket 46, (see Fig. 5,) in which engages a downwardly-projecting part 47, formed on the bolt 1, so that the bolt 1 and cocking-rod 5, with its rear part 7, always move to and fro as one piece.

When the cartridge 14 has by the spring 17 in the magazine been carried onto the top of the carrier-block 9, as in Fig. 1, it is important that the carrier-block should be timed, so as not to commence to rise until the cocking-rod 5 with the bolt 1 have moved back far enough for the back of the cartridge to clear the fore part of the bolt as the cartridge rises up into position at the back of the chamber 2. This is effected by the side spring 48, which by the screw 49 is fixed to the side of the back part 7 of the cocking-rod 5, and, as will be seen clearly by Fig. 6, this spring 48 is made with an inwardly-projecting end 50, which rides along a ledge or flange 51, which is formed on the base 52 of the carrier-block 9 and extends backwardly some distance behind the inclined surface 13, as shown by Figs. 1, 2, 3, and 7.

When the carrier-block 9 is in the position shown by Fig. 1, the spring 10, which takes into the hole 22 in the carrier-block 9, forces the carrier-block upwardly, so that the ledge 51 presses against the end 50 of the spring 48, and as the backward movement of the cocking-rod 5 is continued and the cross-pin 12 leaves the inclined surface 13 the carrier-block 9 is by the spring 48, riding on the ledge 51, effectually prevented from rising until the spring rides off the back end of the base part 52 of the carrier-block 9, so that the latter, with the cartridge, is now by the spring 10 caused to rise up quickly to the position shown in Fig. 2 with the cartridge in position for being pushed forward into the chamber 2. The bolt 1 has now pressed back the hammer 4 far enough for its back end 53 to be engaged by the sear 36, as in Figs. 2 and 3. Now as the cocking-rod 5 is moved forward again the fore part 24 of the bolt 1 pushes against the back end of the cartridge 14 and moves the same forward for a certain distance into the chamber 2, and as this takes place the carrier-block 9 is moved down for a certain distance by the fore part 24 of the bolt acting on the inclined part 18 of the carrier-block. The cartridge is meanwhile clipped by the spring 23; but as this spring would not allow the rim of the cartridge to pass it the parts are so arranged and timed that just before the rim of the cartridge in moving forward comes in contact with the spring 23 the pin 12 begins to act upon the lower part of the incline 13 and presses down the carrier-block 9, so that the spring 23 moves down over the cartridge and clears the rim while the cartridge is being pushed forward into the chamber by the bolt 1. When the carrier-block 9 commences to move down, its base 52 will be above the turned-in end 50 of the spring 48 until this turned-in end comes to the inclined side slot 54 in the base 52, which forces the spring 48 outwardly sidewise as it rises up the slot on the ledge 51. This inclined slot 54 is so shaped, as shown in Figs. 7 and 8, that it does not cut into the ledge 51 to arrest the sliding movement of the end 50 of the spring 48 when the cocking-rod 5 with its back portion 7 are being pushed backward, as above described. When the cocking-rod 5 has been moved to its extreme forward position, as in Fig. 1, the next cartridge is by the spring 17 pushed from the magazine into position on the top of the carrier-block 9, resting against the stationary block 55, which forms a part of the frame. The carrier-block 9 is made of just the proper length from front to back to receive one cartridge, so that when one cartridge has been fed onto it, as shown in Fig. 1, this cartridge stops the next cartridge from coming out of the magazine until the carrier-block has been raised, as in Fig. 2, when the next cartridge in the magazine presses against the carrier-block ready to travel into the recess on the top of the carrier-block, when the latter is lowered by the next forward movement of the cocking-rod, as above described.

The magazine for containing the cartridges consists of a thin metal tube 16 of the proper internal diameter for the cartridges to slide easily along it and to be contained in a row one in front of the other, as shown in Figs. 1 and 2. This tubular magazine 16 fits in a hole in the stock 56 of the rifle, as shown, underneath the barrel 3, and is held in position by any convenient means, as by the small peg 57 on the magazine, which takes into a bayonet-slot in a clip-bracket 58, fixed to the under side of the barrel. The magazine 16 is slotted longitudinally at 59 for the greater portion of its length, and working in this slot there is a screw or peg 60, which is fixed to the block 61, which can slide to and fro along the magazine, and this block is continuously pressed toward the open end 62 of the magazine by means of the internal coiled spring 17, the other end of which abuts against the closed end 63 of the magazine.

Before filling the magazine it has to be removed from the rifle, which is done by turning it axially, so as to free the pin 57 from the bayonet-slot in the clip-bracket before mentioned, and then the magazine can be withdrawn endwise and up-ended, as in Fig. 17. The sliding block 61 is by the peg 60 moved back so as to compress the spring, and this peg 60 is then turned into the side slot 62', so as to block the spring 17 in its compressed position. The cartridges can now be placed in the magazine from the open end 62 of the same. Now the magazine with the cartridges is placed in position under the barrel 3 of the rifle and pushed into the hole in the stock 56 and then turned so that the pin 57 engages with the bayonet-slot in the clip before mentioned. The block 61 is now turned axially by the peg 60, so that the latter can slide along the slot 59, and the block 61 presses upon the cartridges backward to feed them in successive order onto the carrier-block to be raised by the latter to the front of the chamber, as above described. The hammer is held back when the bolt is closed by the sear 36, which is depressed when firing by the engagement of the trigger with the slot in its rear end, the trigger being pivoted at X'.

What we claim, and desire to secure by Letters Patent of the United States, is—

1. In a repeating-rifle the combination with the bolt, of a cocking-rod movable longitudinally of the rifle, a carrier-block serving to raise the cartridges to the chamber and movable in a slot in the cocking-rod, said block having an inclined slot, a spring for raising the carrier-block, a cross-pin carried by the cocking-rod and engaging the said inclined slot and a bolt-check operated by the cocking-rod, substantially as described.

2. In a repeating-rifle the combination with the bolt, of a cocking-rod connected therewith and movable longitudinally of the rifle, a carrier-block serving to raise the cartridges to the chamber and movable in a slot in the cocking-rod, said block having an inclined slot, a cross-pin on the cocking-rod engaging said inclined slot, a spring-latch carried by the cocking-rod slidably engaging said carrier-block during part of the movement of said cocking-rod, and a bolt-check operated by the cocking-rod, as described.

3. In a repeating-rifle the combination with the stock of a tube 16 fitted to said stock and serving as a magazine, a peg 57 in said tube, a clip-bracket 58 having a bayonet-slot fixed to the under side of the rifle-barrel, a block 61 slidable in said tube 16 and a peg 60 connected to said block and fitting a slot in said tube, substantially as described.

In testimony whereof we have signed our names to this specification in the presence of two subscribing witnesses.

ROBERT CAMPBELL STEVENSON.
CHARLES RYLAND.

Witnesses:
WALLACE FAIRWEATHER.
JNO. ARMSTRONG, Junr.